US012518584B2

(12) United States Patent
Kawauchi

(10) Patent No.: US 12,518,584 B2
(45) Date of Patent: Jan. 6, 2026

(54) LOCK CONTROL SYSTEM, PROGRAM, TERMINAL DEVICE, AND LOCK CONTROL METHOD

(71) Applicant: MINEBEA MITSUMI Inc., Nagano (JP)

(72) Inventor: Hideaki Kawauchi, Tokyo (JP)

(73) Assignee: MINEBEA MITSUMI Inc., Nagano (JP)

(*) Notice: Subject to any disclaimer, the term of this patent is extended or adjusted under 35 U.S.C. 154(b) by 0 days.

(21) Appl. No.: 18/574,346

(22) PCT Filed: Jun. 28, 2022

(86) PCT No.: PCT/JP2022/025796
§ 371 (c)(1),
(2) Date: Jun. 20, 2024

(87) PCT Pub. No.: WO2023/277023
PCT Pub. Date: Jan. 5, 2023

(65) Prior Publication Data
US 2024/0371225 A1 Nov. 7, 2024

Related U.S. Application Data

(60) Provisional application No. 63/217,819, filed on Jul. 2, 2021.

(30) Foreign Application Priority Data

Sep. 9, 2021 (JP) ................................ 2021-146999

(51) Int. Cl.
G07C 9/29 (2020.01)
G06K 7/10 (2006.01)

(52) U.S. Cl.
CPC ........... *G07C 9/29* (2020.01); *G06K 7/10366* (2013.01)

(58) Field of Classification Search
CPC ............ G07C 9/29; G07C 2009/00793; G07C 2209/08; G07C 2209/63; G07C 9/00309; G06K 7/10366; E05B 49/00; G01S 19/14
See application file for complete search history.

(56) References Cited

U.S. PATENT DOCUMENTS 8,930,045 B2 * 1/2015 Oman ................ G07C 9/00309
340/426.36
11,799,671 B2 * 10/2023 Coode ................... H04L 9/0825
(Continued)

FOREIGN PATENT DOCUMENTS

CA      2947627 C  *  6/2022  ......... G07C 9/00309
JP   2001-051040       2/2001
(Continued)

OTHER PUBLICATIONS

JP6872070B1 Lock Control Device, Lock Control Program, and Lock Control Method, 11 Pages (Year: 2025).*
(Continued)

Primary Examiner — Tuyen K Vo
(74) Attorney, Agent, or Firm — IPUSA, PLLC

(57) ABSTRACT

A lock control system includes a terminal device including circuitry, and the circuitry detects a distance between an electronic lock and the terminal device, controls unlocking of the electronic lock based on the distance, determines whether the distance is falsely detected based on a predetermined signal that the electronic lock transmits via near-field communication, and stops the control of the unlocking of the electronic lock upon determining that the distance is falsely detected.

9 Claims, 9 Drawing Sheets

(56) References Cited

U.S. PATENT DOCUMENTS

| | | | |
|---|---|---|---|
| 2013/0331087 A1 | 12/2013 | Shoemaker et al. | |
| 2016/0063786 A1* | 3/2016 | Lewis | B60R 25/24 340/5.72 |
| 2018/0099643 A1* | 4/2018 | Golsch | G01S 13/765 |
| 2022/0383677 A1* | 12/2022 | Klink | G07C 9/00182 |

FOREIGN PATENT DOCUMENTS

| | | |
|---|---|---|
| JP | 2003-148017 | 5/2003 |
| JP | 2010-159698 | 7/2010 |
| JP | 2016-014638 | 1/2016 |
| JP | 2016-174370 | 9/2016 |
| JP | 6872070 | 5/2021 |

OTHER PUBLICATIONS

International Search Report for PCT/JP2022/025796 mailed on Aug. 23, 2022.

\* cited by examiner (REGISTERED TRADEMARK: Bluetooth)

LOCK CONTROL SYSTEM, PROGRAM, TERMINAL DEVICE, AND LOCK CONTROL METHOD

This application claims priority of U.S. Provisional Patent Application No. 63/217,819, filed with the United States Patent and Trademark Office, on Jul. 2, 2021, and Japanese Patent Application No. 2021-146999, filed with Japan Patent Office on Sep. 9, 2021, the entire contents of which are incorporated herein by reference.

TECHNICAL FIELD

The present disclosure relates to a lock control system, a program, a terminal device, and a lock control method.

BACKGROUND

Lock control systems are known to control unlocking or locking of an electronic lock based on a distance between the electronic lock and a terminal device that controls the electronic lock is known (for example, see Patent Documents 1 to 3).

RELATED-ART DOCUMENTS

Patent Documents

Patent Document 1: Japanese Unexamined Patent Application Publication No. 2010-159698
Patent Document 2: Japanese Unexamined Patent Application Publication No. 2016-174370
Patent Document 3: Japanese Unexamined Patent Application Publication No. 2003-148017

SUMMARY

Problem to be Solved by the Invention

In conventional techniques as described in Patent Documents 1 to 3, the distance between the electronic lock and the terminal device is determined based on a positioning result of position information that is obtained, for example, by a global positioning system (GPS) or the like, and then the electronic lock is controlled to be unlocked based on the determined distance.

However, in such an approach, an error may be included in the positioning result of the position information obtained by the GPS or the like, and thus the electronic lock may be unlocked by mistake due to false detection in the position information.

In the present disclosure, a malfunction due to false detection in position information is reduced in the lock control system that controls the unlocking of the electronic lock.

Means for Solving the Problem

A lock control system in one aspect of the present disclosure includes an electronic lock and a program configured to be executed by a terminal device that controls the electronic lock. The program causes the terminal device to perform a distance detection process of detecting a distance between the electronic lock and the terminal device, an unlocking control process of controlling unlocking of the electronic lock based on the distance, a determination process of determining whether the distance is falsely detected based on a predetermined signal that the electronic lock transmits via near-field communication, and a stop process of stopping the unlocking control process upon determining that the distance is falsely detected.

Effects of the Invention

In one aspect of the present disclosure, a malfunction due to false detection in position information is reduced in a lock control system that controls unlocking of an electronic lock.

MODE FOR CARRYING OUT THE INVENTION

Hereinafter, embodiments according to the present disclosure will be described with reference to the drawings.

<Configuration Example of Lock Control System>

Figure 1:
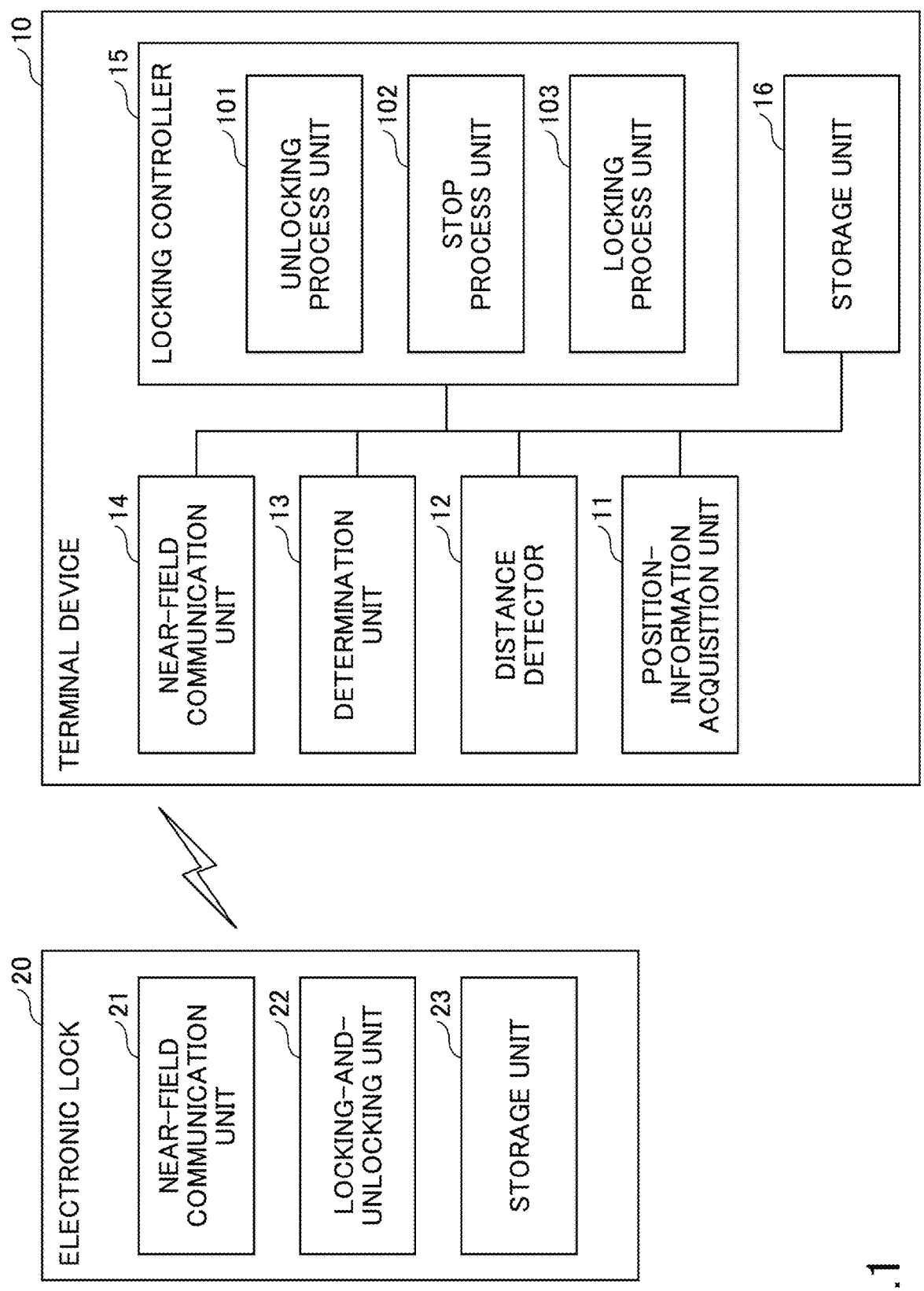
FIG. 1 is a diagram showing a configuration example of a lock control system according to one embodiment.

FIG. 1 is a diagram showing a configuration example of a lock control system according to one embodiment. A lock control system 1 includes an electronic lock 20 and a terminal device 10 that controls the electronic lock 20. The lock control system 1 is a system that unlocks and locks the electronic lock 20 by using the terminal device 10.

The electronic lock 20 is a key that allows for unlocking, locking, and the like of a door or the like by using the terminal device 10. The electronic lock 20 is also called a smart lock. The electronic lock 20 is not limited to the use of the door, and may be used to unlock and lock a drawer, a locker, an automobile, a motorcycle, a bicycle, an electronic device, or the like.

The electronic lock 20 includes, for example, functional components such as a near-field communication unit 21, a locking-and-unlocking unit 22, and a storage unit 23, as shown in FIG. 1. The near-field communication unit 21 performs a communication process of communicating with the terminal device 10 via near-field communication such as Bluetooth (registered trademark). The near-field communication unit 21 may perform near-field communication, for example, by any other near-field communication such as ZigBee (registered trademark), sound wave communication, infrared communication, or the like. In this description, in an example, the following description will be provided on the assumption that the near-field communication unit 21 performs the near-field communication according to a Bluetooth standard.

The locking-and-unlocking unit 22 performs a locking-and-unlocking process in which the electronic lock 20 is locked or unlocked in accordance with a control signal, such as an unlocking command or a locking command, that the near-field communication unit 21 receives from the terminal device 10. The storage unit 23 stores information of the terminal device 10 that is paired with the electronic lock 20, and stores various information, data, a program, or the like that is necessary for the operation of the electronic lock 20. The above functional components may be implemented by a given program that is executed by a computer that implements the electronic lock 20, or may be implemented by hardware.

The terminal device 10 is a general-purpose information terminal such as a smartphone, a tablet device, or a wearable device. When the terminal device 10 executes an application program (hereinafter may be referred to as an application) used in the electronic lock 20, functional components that include, for example, a position-information acquisition unit 11, a distance detector 12, a determination unit 13, a near-field communication unit 14, a locking controller 15, and a storage unit 16 are implemented. At least a portion of the functional components may be implemented by hardware.

The terminal device 10 is not limited to the general-purpose information device, and may be a dedicated device for the lock control system 1. In this case, for example, when the terminal device 10 executes firmware that is incorporated in the terminal device 10 in advance, the terminal device 10 implements the functional components of the terminal device 10 as illustrated in FIG. 1. In this description, in an example, the following description will be provided on the assumption that the terminal device 10 is a smartphone that executes one or more applications (programs) for the lock control system 1.

The position-information acquisition unit 11 performs a position-information acquisition process in which position information (coordinate information or the like) indicating a position of the terminal device 10 is acquired, for example, by using a global positioning system (GPS) function or the like included in the terminal device 10. In addition to (or instead of) the GPS function, the position-information acquisition unit 11 may acquire the position information of the terminal device 10, for example, based on identification information of an access point of a wireless local area network (LAN), or on a radio wave or the like from a base station in a wireless wide area network (WAN). In this description, in an example, the following description will be provided on the assumption that the position-information acquisition unit 11 acquires the position information of the terminal device 10 by using the GPS function of the terminal device 10.

The distance detector 12 performs a distance detection process in which a distance between the electronic lock 20 and the terminal device 10 is detected based on the position information acquired by the position-information acquisition unit 11. For example, the distance detector 12 calculates the distance between the electronic lock 20 and the terminal device 10 by using the position information (coordinate information) of the electronic lock 20 that is stored in advance in the storage unit 16, and using the position information (coordinate information) of the terminal device 10 acquired by the position-information acquisition unit 11.

The near-field communication unit 14 performs a near-field communication process of communicating with the electronic lock 20 via the same near-field communication as used in the electronic lock 20. In this description, in an example, the following description will be provided on the assumption that the near-field communication unit 14 performs the near-field communication with the electronic lock 20 by using a Bluetooth function included in the terminal device 10. It is assumed that the terminal device 10 is paired in advance with the electronic lock 20 corresponding to the terminal device 10 such that the terminal device 10 can communicate with the electronic lock 20 by Bluetooth communication.

The locking controller 15 performs a locking control process in which the electronic lock 20 is controlled using the near-field communication unit 14. The locking controller 15 includes, for example, an unlocking process unit 101, a stop process unit 102, a locking process unit 103, and the like, as illustrated in FIG. 1.

The unlocking process unit 101 performs an unlocking control process in which the electronic lock 20 is controlled to be unlocked based on a distance that is between the terminal device 10 and the electronic lock 20 and is detected by the distance detector 12. For example, when the near-field communication unit 14 is paired with the electronic lock 20, the unlocking process unit 101 acquires the position information of the terminal device 10 by using the position-information acquisition unit 11, and then stores the acquired position information in the storage unit 16 as position information of the electronic lock 20. With this arrangement, the distance detector 12 can calculate the distance between the electronic lock 20 and the terminal device 10, by using the position information of the electronic lock 20 stored in the storage unit 16 and using the position information of the terminal device 10 acquired by the position-information acquisition unit 11.

The unlocking process unit 101 enables a hands-free function (unlocking control process) of the terminal device 10, based on the distance detected by the distance detector 12. For example, when the distance detector 12 detects that the terminal device 10 is separated from the electronic lock 20 by a predetermined first distance or more, the unlocking process unit 101 enables the hands-free function of the terminal device 10.

In this description, the hands-free function is a function in which when a user who uses the terminal device 10 approaches the electronic lock 20, the electronic lock 20 can be unlocked without operating the terminal device 10. The hands-free function is an example of the unlocking control process in which the electronic lock is controlled to be unlocked based on the distance detected by the distance detector 12. Also, as the first distance, a distance (which is approximately, for example, from 100 m to 200 m, and 150 m or the like is used as one example) used to detect that the terminal device 10 is separated from the electronic lock 20 is preset.

When the hands-free function is enabled, the unlocking process unit 101 unlocks the electronic lock 20 based on the distance detected by the distance detector 12. For example, when the distance detector 12 detects that the terminal device 10 approaches a position within a predetermined second distance that is from the electronic lock 20 and is less than the first distance, the unlocking process unit 101 transmits the unlocking command to the electronic lock 20 via near-field communication by using the near-field communication unit 21, and then unlocks the electronic lock 20. In this description, as the second distance, a distance (which is approximately, for example, from 30 m to 70 m, and 50 m or the like is used as one example) that is less than the first distance is preset in order to detect that the terminal device 10 approaches the electronic lock 20.

The unlocking process unit 101 disables the hands-free function, after unlocking the electronic lock 20. With this arrangement, the electronic lock 20 can be prevented from being unintentionally unlocked in a case or the like where, for example, a user who uses the terminal device 10 approaches the electronic lock 20 while the user is at home.

However, when only the above approach is adopted, the electronic lock may be unlocked by mistake due to false detection in the position information because an error is included in the positioning result of the position information obtained by a GPS or the like. For example, when the user who uses the terminal device 10 is at home, in a case where it is detected that the terminal device 10 is separated from the electronic lock 20 due to false detection in the position information and then it is detected that the terminal device 10 approaches the electronic lock 20 based on correct position information, the electronic lock 20 may be unlocked by mistake. In view of the above situation, the terminal device 10 according to the present embodiment includes the determination unit 13 and the stop process unit 102.

The determination unit 13 performs a determination process in which the distance detected by the distance detector 12 is determined to be obtained by false detection based on a predetermined signal that the electronic lock 20 transmits via near-field communication. For example, when the distance detector 12 detects that the terminal device 10 is separated from the electronic lock 20 by the first distance or more, in a case where the predetermined signal transmitted by the electronic lock 20 via the near-field communication can be received, the determination unit 13 determines that the detection result by the distance detector 12 is obtained by false detection. Alternatively, before a predetermined time elapses since the distance detector 12 detects that the terminal device 10 is separated from the electronic lock 20 by the first distance or more, when the distance detector 12 detects that the terminal device 10 approaches to a position within the second distance, the determination unit 13 determines that the detection result by the distance detector 12 is obtained by false detection.

When the detection result of the distance by the distance detector 12 is determined to be obtained by false detection, the stop process unit 102 stops the unlocking control process that the unlocking process unit 101 performs. A specific process by the determination unit 13 and the stop process unit 102 will be described below in first and second embodiments.

For example, in accordance with a user's operation that is performed on an application operation screen displayed on a display or the like of the terminal device 10, the locking process unit 103 transmits the locking command to the electronic lock 20 through the near-field communication unit 14, and then performs a locking process in which the electronic lock 20 is locked. In addition to the unlocking control process described above, the unlocking process unit 101 further transmits the unlocking command to the electronic lock 20 through the near-field communication unit 14, in accordance with the user's operation on the application operation screen, and then performs the unlocking process in which the electronic lock 20 is unlocked.

The storage unit 16 stores various information necessary for the operation of the terminal device 10, such as information of the electronic lock 20 that is paired with the terminal device 10 and information of the terminal device 10. The storage unit 16 stores data and programs, and the like.

<Hardware Configuration>

Figure 2:
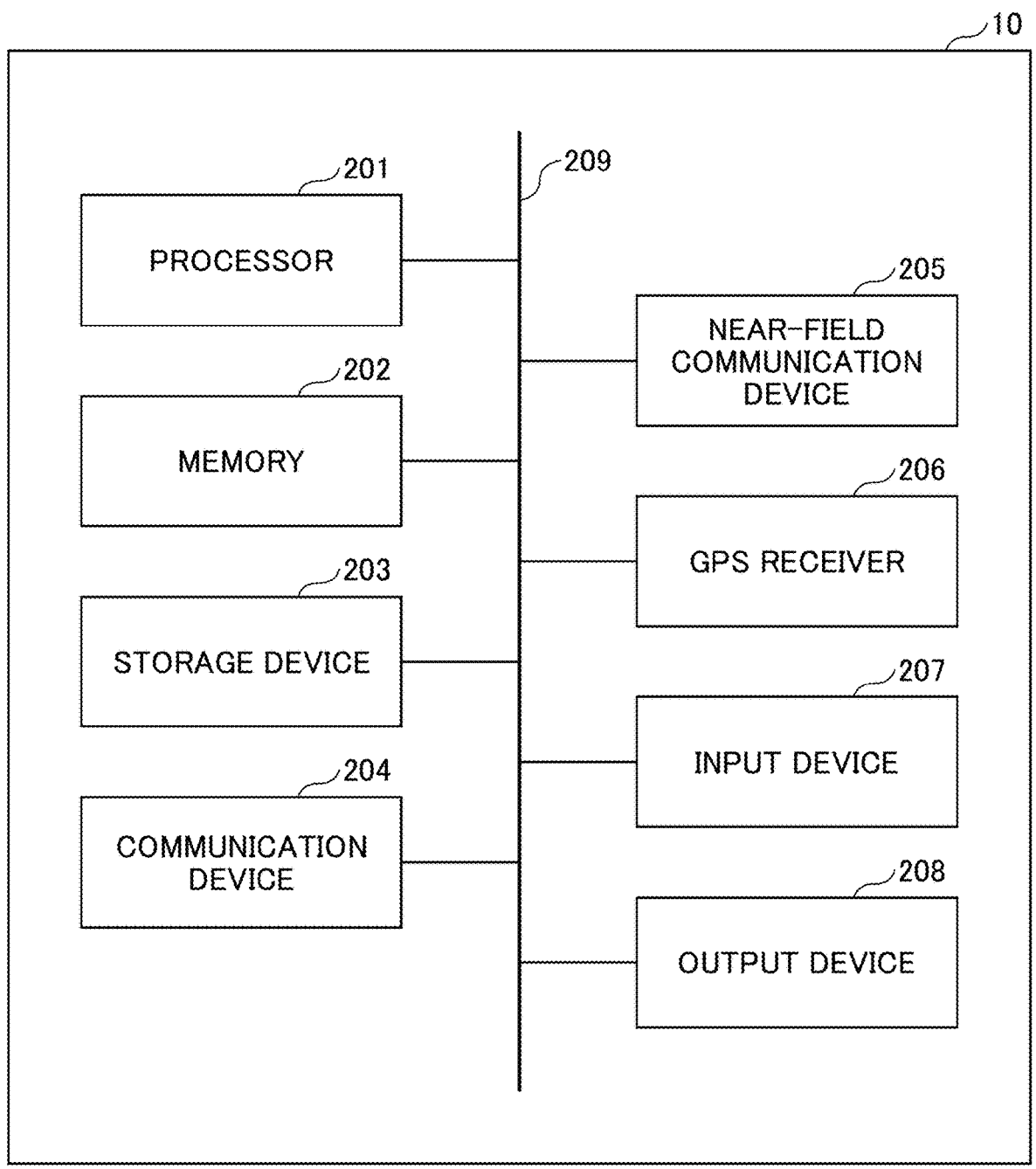
FIG. 2 is a diagram showing an example of a hardware configuration of a terminal device according to one embodiment.

FIG. 2 is a diagram illustrating an example of a hardware configuration of the terminal device according to one embodiment. The terminal device 10 has a computer configuration, and includes, for example, a processor 201, a memory 202, a storage device 203, a communication device 204, a near-field communication device 205, a GPS receiver 206, an input device 207, an output device 208, and a bus 209.

The processor 201 is an arithmetic unit such as a central processing unit (CPU) that implements a functional configuration of the terminal device 10 as illustrated in FIG. 1, and the functional configuration is implemented by executing a predetermined program that is stored in a storage media such as the memory 202 or the storage device 203. The memory 202 is a computer-readable storage media, and includes, for example, a random access memory (RAM), a read only memory (ROM), and the like. The storage device 203 is a computer-readable storage medium, and may include, for example, a hard disk drive (HDD), a solid state drive (SSD), or the like.

The communication device 204 includes at least one communication device that connects the terminal device 10 to a communication network by wireless communication such as a wireless LAN or a wireless WAN. The near-field communication device 205 includes at least one communication device that communicates with the electronic lock 20 via near-field communication such as Bluetooth or Zigbee. A GPS receiver 206 includes a positioning device that receives a positioning signal from a GPS satellite and outputs position information (coordinate information).

The input device 207 includes an input device (for example, a keyboard, a mouse, a microphone, a switch, a sensor, or the like) that receives an input from an external device. The output device 208 includes a display, a speaker, and the like. The input device 207 and the output device 208 may be, for example, an input-and-output device such as a touch panel display. A bus 209 is commonly connected to the above-mentioned components, and transmits, for example, address signals, data signals, and various control signals. The processor 201 may include a processor other than the CPU, such as a graphics processing unit (GPU) or a digital signal processor (DSP).

<Process Outline>

Figure 3:
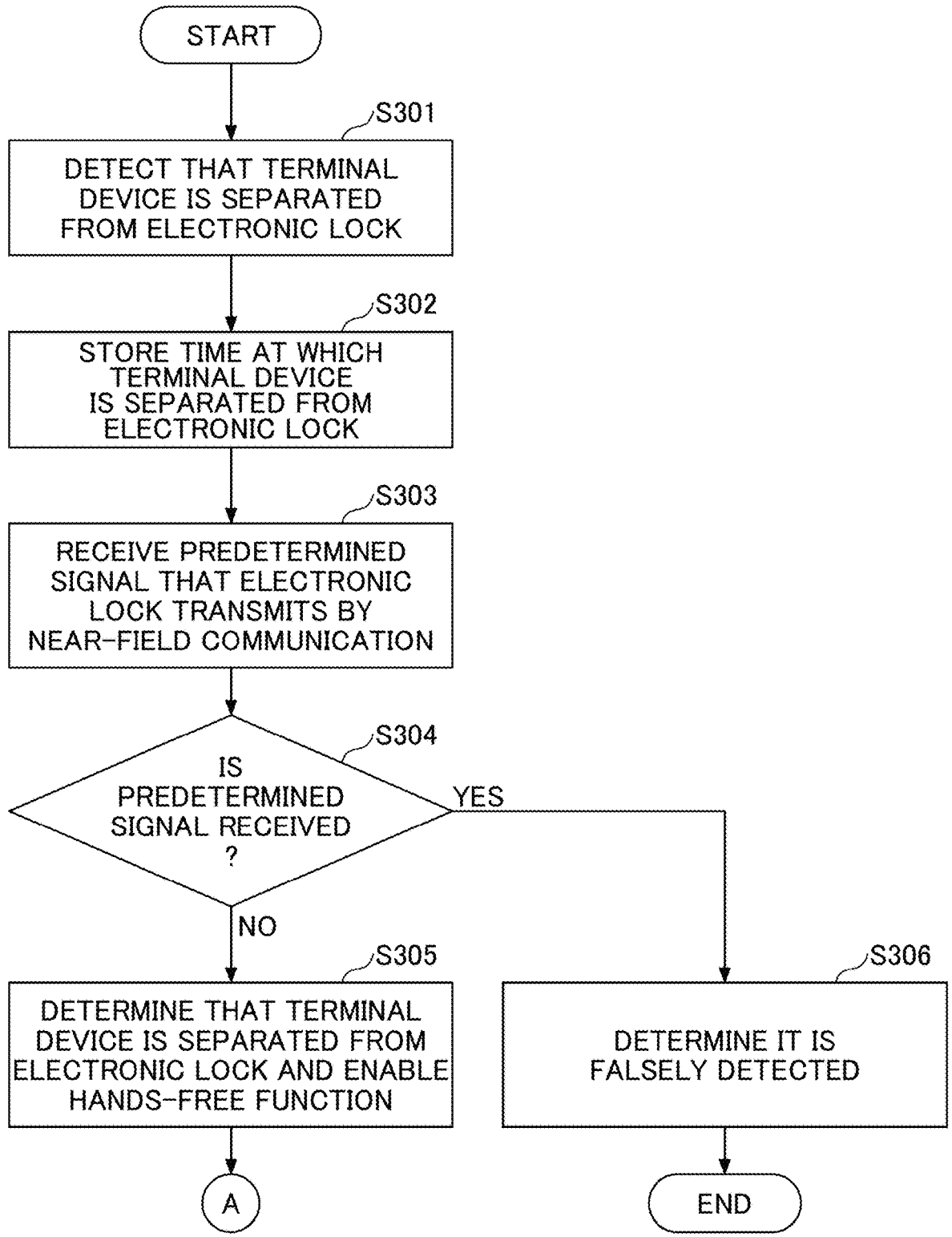
FIG. 3 is a flowchart (1) showing the outline of a process by the terminal device according to one embodiment.
Figure 4:
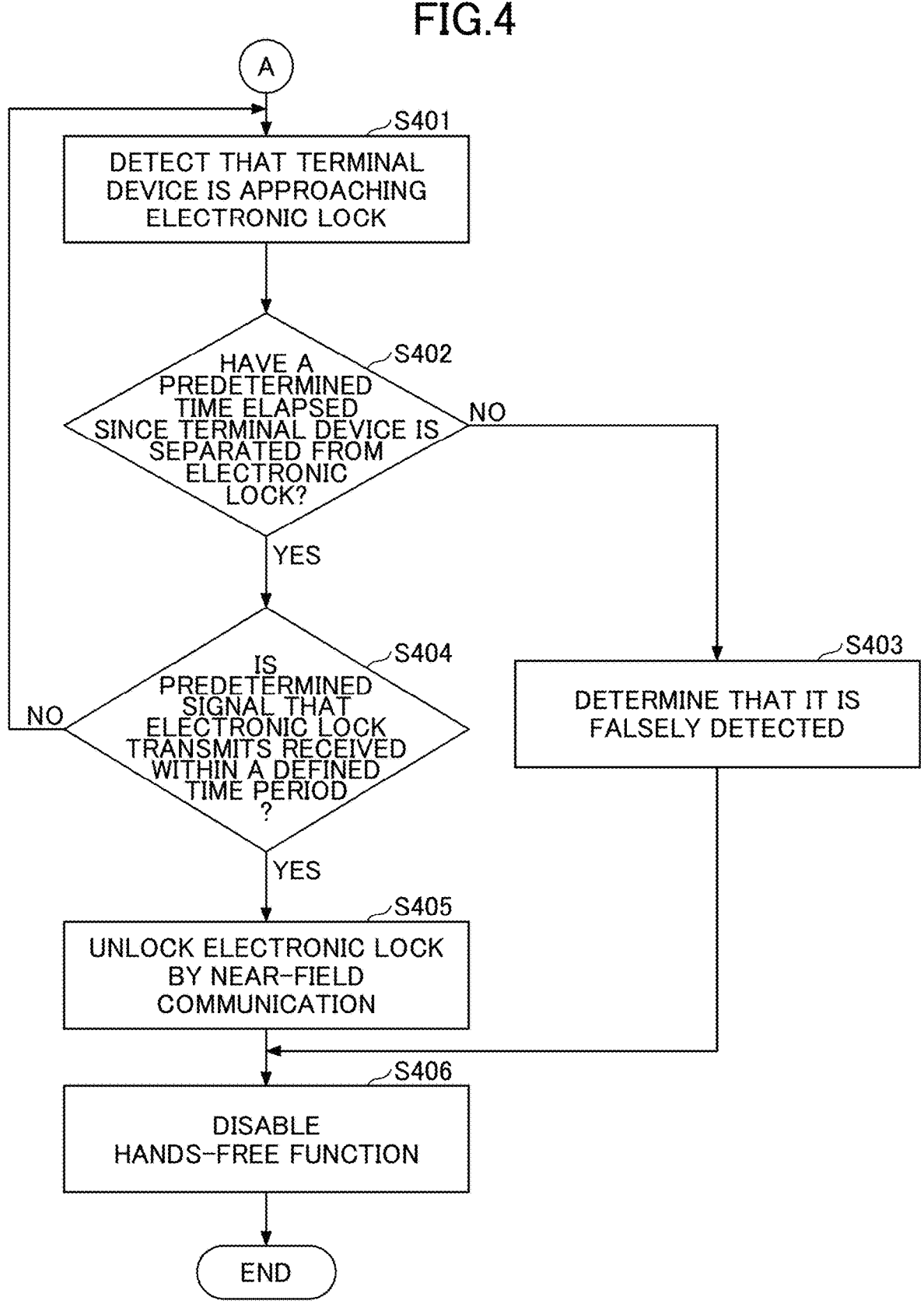
FIG. 4 is a flowchart (2) showing the outline of the process by the terminal device according to one embodiment.

FIGS. 3 and 4 are flowcharts illustrating an overview of the process by the terminal device according to one embodiment. This process shows the outline of a process related to the hands-free function, which is performed by the terminal device 10. At the starting of the process shown in FIG. 3, the electronic lock 20 and the terminal device 10 have completed a pairing process, and are set to communicate with each other via near-field communication. In addition, it is assumed that the hands-free function (unlocking control process) is disabled in the terminal device 10.

In step 301, when the distance detector 12 detects that the terminal device 10 is separated from the electronic lock 20, for example, based on position information acquired by the position-information acquisition unit 11, the terminal device 10 performs a process after step S302.

When the process is transferred to step S302, the distance detector 12 stores a time at which the terminal device 10 is separated from the electronic lock 20, in the storage unit 16. Such a process may be performed by the locking controller 15, for example. This process is optional, and is not required.

In step S303, the near-field communication unit 14 receives a predetermined signal (for example, a beacon signal including information for identifying the electronic lock 20) that the electronic lock 20 transmits via near-field communication.

In step S304, the determination unit 13 determines whether the near-field communication unit 14 receives the predetermined signal transmitted by the electronic lock 20 via near-field communication. If the predetermined signal is not received, the determination unit 13 transfers the process to step S305. On the other hand, if the predetermined signal is received, the determination unit 13 transfers the process to step S306.

When the process is transferred to step S305, the determination unit 13 determines that the terminal device 10 is separated from the electronic lock 20 without the distance detected by the distance detector 12 being obtained by false detection, and then enables the hands-free function. In this case, the terminal device 10 performs, for example, the unlocking control process as illustrated in FIG. 4.

On the other hand, when the process is transferred to step S306, the determination unit 13 determines that the distance detected by the distance detector 12 is obtained by false detection. In this case, the stop process unit 102 stops the unlocking control process by the terminal device 10.

Next, the unlocking control process performed by the terminal device 10 when the hands-free function is enabled will be described with reference to FIG. 4. When the hands-free function is enabled, the distance detector 12 repeatedly detects the distance between the terminal device 10 and the electronic lock 20, based on the position information acquired by the position-information acquisition unit 11.

Also, in step S401, when the distance detector 12 detects that the terminal device 10 approaches the electronic lock 20, the terminal device 10 performs the process after step S402.

When the process is transferred to step S402, the determination unit 13 determines whether a predetermined time has elapsed since the terminal device 10 is separated from the electronic lock 20. If the predetermined time has not elapsed, the determination unit 13 transfers the process to step S403. On the other hand, if the predetermined time has elapsed, the determination unit 13 transfers the process to step S404. Here, the predetermined time is set in advance to be less than a time period required for a person who is away from the electronic lock 20 by the first distance or more to return to a position within the second distance from the electronic lock 20.

When the process is transferred to step S403, the determination unit 13 determines that the distance detected by the distance detector 12 is obtained by false detection. In this case, the stop process unit 102 stops the unlocking control process, and then transfers the process to step S406. The process in steps S402 and S403 is optional and is not required.

When the process is transferred to step S404, the unlocking process unit 101 determines whether the near-field communication unit 14 receives a predetermined signal (beacon signal) that the electronic lock 20 transmits via near-field communication. If the predetermined signal transmitted by the electronic lock 20 cannot be received within a defined time period, the unlocking process unit 101 returns the process to step S401, for example. On the other hand, if the predetermined signal transmitted by the electronic lock 20 is received within the defined time period, the unlocking process unit 101 transfers the process to step S405.

When the process is transferred to step S405, the unlocking process unit 101 transmits, for example, the unlocking command to request the electronic lock 20 to be unlocked, by using the near-field communication unit 14, and thus unlocks the electronic lock 20.

In step S406, the unlocking process unit 101 disables the hands-free function. With this approach, for example, when the user who uses the terminal device 10 is at home or the like, in a case where the terminal device 10 approaches the electronic lock 20, the electronic lock 20 can be prevented from being erroneously unlocked.

<Process Flow>

Next, a specific process flow by a lock control method according to the present embodiment will be described while illustrating various embodiments.

First Embodiment

Figure 5:
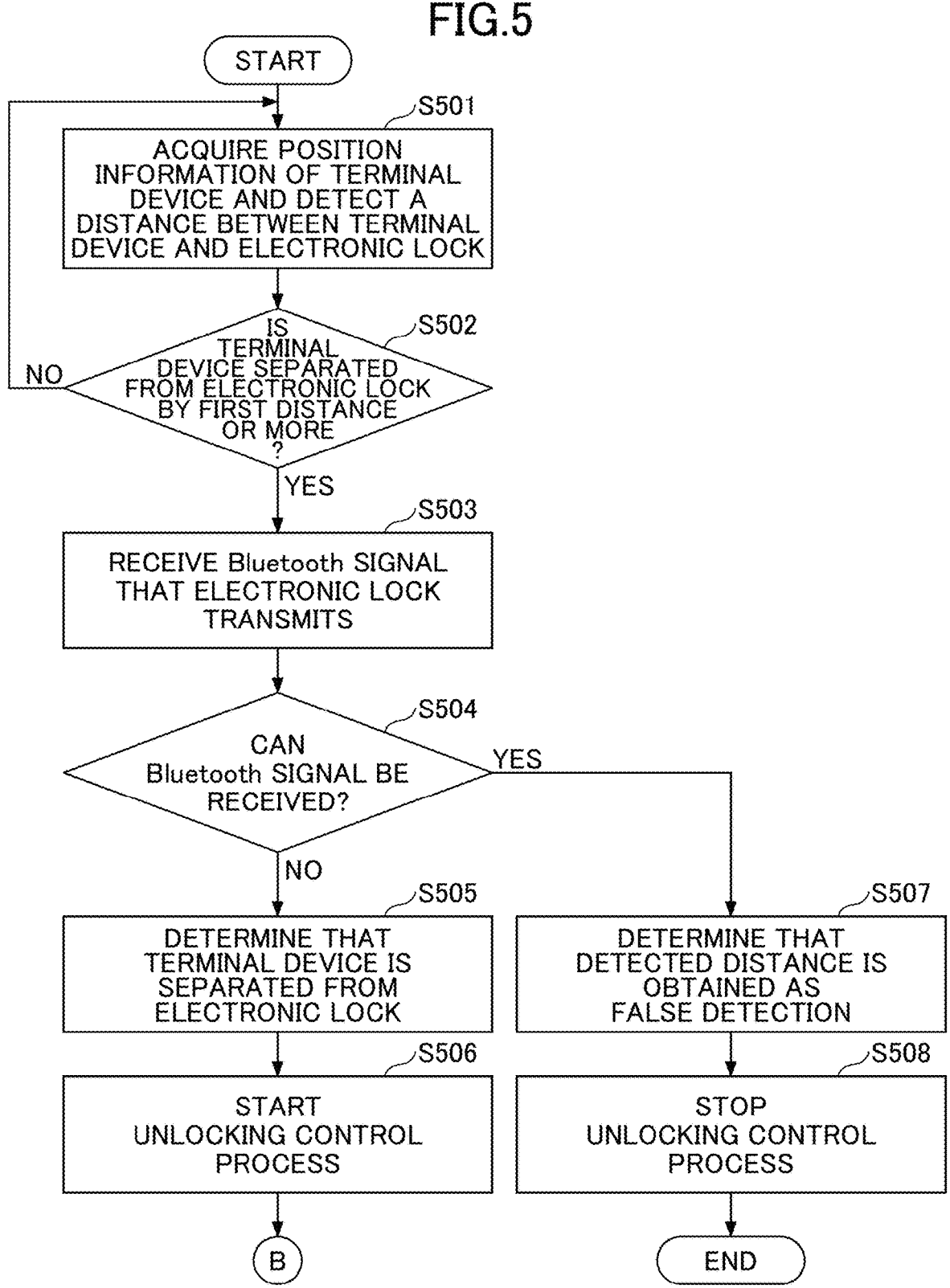
FIG. 5 is a flowchart (1) showing an example of the process by the terminal device according to a first embodiment.
Figure 6:
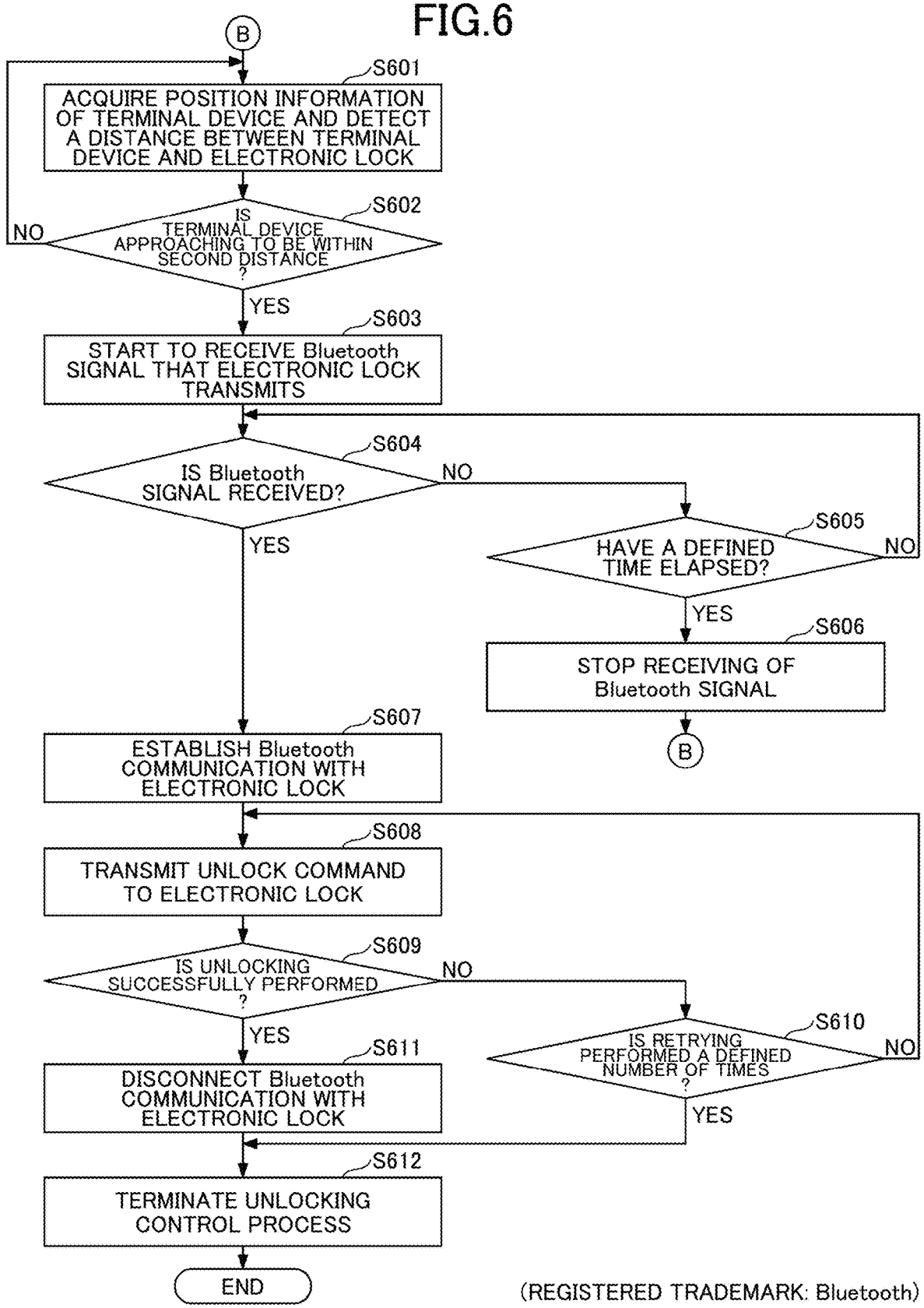
FIG. 6 is a flowchart (2) showing an example of the process by the terminal device according to the first embodiment.

FIGS. 5 and 6 are flowcharts illustrating an example of the process by the terminal device according to a first embodiment. This process is an example of a specific process relating to the process described in FIGS. 3 and 4.

In step S501, the distance detector 12 acquires the position information of the terminal device 10 by using the position-information acquisition unit 11, and detects (calculates) the distance between the terminal device 10 and the electronic lock 20.

In step S502, the distance detector 12 determines whether the distance between the terminal device 10 and the electronic lock 20 is greater than or equal to a predetermined first distance. Here, as described above, the first distance is a preset distance used to detect that the terminal device 10 is separated from the electronic lock 20.

If the distance between the electronic lock 20 and the terminal device 10 is not greater than or equal to the first distance, the distance detector 12 returns the process to step S501. On the other hand, if the distance is greater than or equal to the first distance, the distance detector 12 transfers the process to step S503. Steps S501 and S502 are specific examples of the process of detecting that the terminal device 10 is separated from the electronic lock 20.

In step S503, the near-field communication unit 14 receives a Bluetooth signal transmitted by the electronic lock 20. For example, the near-field communication unit 14 receives a beacon signal such as an advertisement packet that the electronic lock 20 repeatedly broadcasts at a predetermined transmission interval. Note that the Bluetooth signal transmitted by the electronic lock 20 includes identification information for identifying the electronic lock 20, such as a universally unique identifier (UUID), and thus the near-field communication unit 14 can identify the Bluetooth signal transmitted by the electronic lock 20 that is paired with the terminal device 10.

In step S504, the determination unit 13 bifurcates the process based on whether the near-field communication unit 14 can receive the Bluetooth signal transmitted by the electronic lock 20. If the Bluetooth signal transmitted by the electronic lock 20 can be received, the determination unit 13 transfers the process to step S507. On the other hand, if the Bluetooth signal transmitted by the electronic lock 20 cannot be received, the determination unit 13 transfers the process to step S505.

When the process is transferred to step S505, the determination unit 13 determines that the terminal device 10 is separated from the electronic lock 20. In step S506, the unlocking process unit 101 starts the unlocking control process as illustrated in FIG. 6.

On the other hand, when the process is transferred from step S504 to step S507, the determination unit 13 determines that the distance detected by the distance detector 12 is obtained by false detection. In the present embodiment, a reaching distance of the Bluetooth signal transmitted by the electronic lock 20 is set to, for example, about 15 m. On the other hand, the first distance is set to be greater than or equal to 100 m, for example. With this arrangement, if the near-field communication unit 14 can receive the Bluetooth signal transmitted by the electronic lock 20, the determination unit 13 can determine that the detection result by the distance detector 12, indicating that the terminal device 10 is separated from the electronic lock 20 by the first distance or more is obtained by false detection.

In step S508, if it is determined that the distance detected by the distance detector 12 is obtained by false detection, the stop process unit 102 stops the unlocking control process as illustrated in FIG. 6.

Next, the unlocking control process performed by the terminal device 10 will be described with reference to FIG. 6. In step S601, the distance detector 12 acquires the position information of the terminal device 10 by using the position-information acquisition unit 11, and detects (calculates) the distance between the terminal device 10 and the electronic lock 20.

In step S602, the distance detector 12 determines whether the distance between the terminal device 10 and the electronic lock 20 is less than or equal to a predetermined second distance. Here, the second distance is a preset distance used to detect that the terminal device 10 approaches the electronic lock 20, as described above.

If the distance between the terminal device 10 and the electronic lock 20 is not less than or equal to the second distance, the distance detector 12 returns the process to step S601. On the other hand, if the distance between the terminal device 10 and the electronic lock 20 is less than or equal to the second distance, the distance detector 12 transfers the process to step S603.

When the process is transferred to step S603, the unlocking process unit 101 causes the near-field communication unit 14 to start receiving the Bluetooth signal transmitted by the electronic lock 20.

In step S604, the unlocking process unit 101 determines whether the near-field communication unit 14 receives the Bluetooth signal transmitted by the electronic lock 20. If the near-field communication unit 14 does not receive the Bluetooth signal, the unlocking process unit 101 transfers the process to step S605. On the other hand, if the near-field communication unit 14 receives the Bluetooth signal, the unlocking process unit 101 transfers the process to step S607.

When the process is transferred to step S605, the unlocking process unit 101 determines whether a defined time has elapsed since the near-field communication unit 14 starts receiving the Bluetooth signal. Here, as the defined time, a time period (which is approximately, for example, several minutes to ten and several minutes) in which a time-out will be performed is set in advance if the near-field communication unit 14 cannot receive the Bluetooth signal. If the defined time has not elapsed, the unlocking process unit 101 returns the process to step S604. On the other hand, if the defined time has elapsed, the unlocking process unit 101 transfers the process to step S606.

When the process is transferred to step S606, the unlocking process unit 101 stops receiving the Bluetooth signal by the near-field communication unit 14, and returns the process to step S601.

On the other hand, when the process is transferred from step S604 to step S607, the unlocking process unit 101 establishes a Bluetooth communication with the electronic lock 20, by using the near-field communication unit 14.

In step S605, the unlocking process unit 101 transmits the unlocking command to cause the electronic lock 20 to be unlocked using the near-field communication unit 14.

In step S606, the unlocking process unit 101 determines whether the electronic lock 20 is successfully unlocked. For example, when the unlocking process unit 101 receives an unlocking-completion notification from the electronic lock 20 through the near-field communication unit 14, the unlocking process unit 101 determines that the electronic lock 20 is successfully unlocked. If the electronic lock 20 is successfully unlocked, the unlocking process unit 101 transfers the process to step S611. On the other hand, if the electronic lock 20 fails to be unlocked, the unlocking process unit 101 transfers the process to step S610.

When the process is transferred to step S610, the unlocking process unit 101 determines whether the transmission of the unlocking command is retried a defined number of times. If the retry is not performed the defined number of times, the unlocking process unit 101 returns the process to step S608. On the other hand, if the retry is performed the defined number of times, the unlocking process unit 101 transfers the process to step S612.

On the other hand, when the process is transferred from step S609 to step S611, the unlocking process unit 101 disconnects the Bluetooth communications with the electronic lock 20 by using the near-field communication unit 14. In step S612, the unlocking process unit 101 terminates the unlocking control process.

In the first embodiment, in the lock control system 1 that controls the unlocking of the electronic lock 20, a malfunction due to false detection in position information can be reduced by the process in FIGS. 5 and 6. For example, when the distance detector 12 falsely detects that the terminal device 10 is separated from the electronic lock 20 by the first distance or more due to an error or the like in the position information, the terminal device 10 can determine that the distance detected by the distance detector 12 is obtained by false detection, and then can stop the unlocking control process.

Second Embodiment

Figure 7:
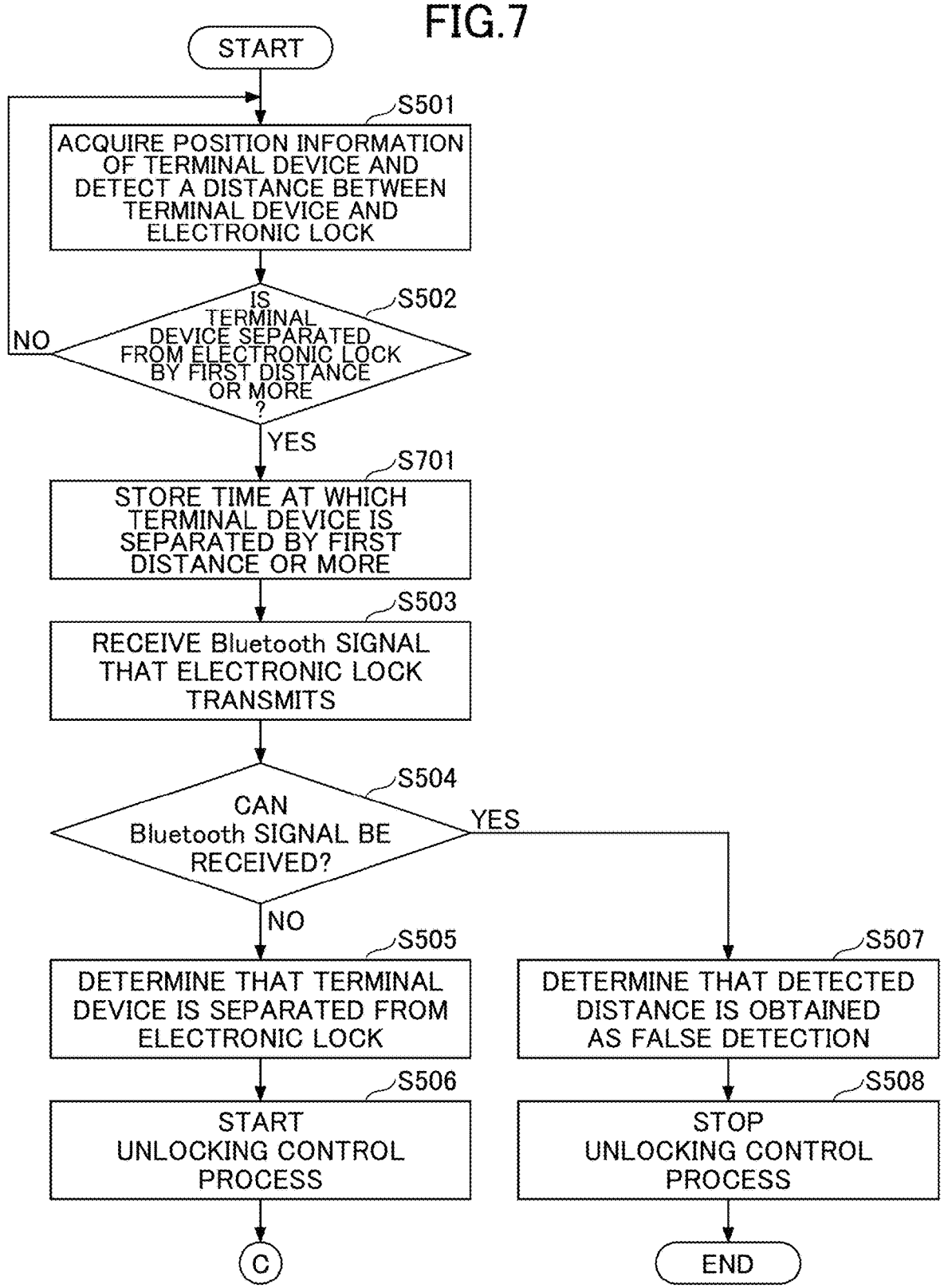
FIG. 7 is a flowchart (1) showing an example of the process by the terminal device according to a second embodiment.
Figure 8:
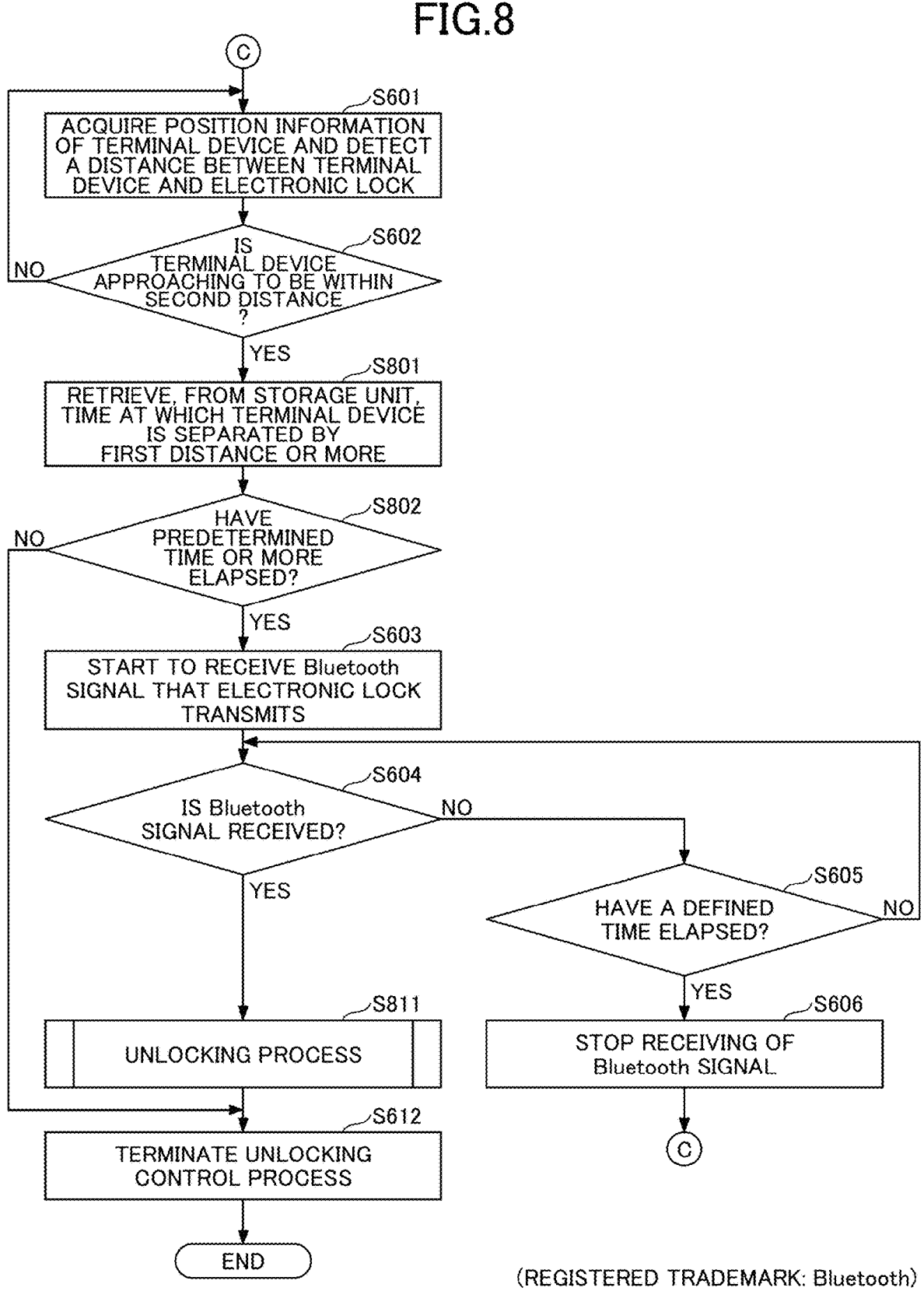
FIG. 8 is a flowchart (2) showing an example of the process by the terminal device according to the second embodiment.

FIGS. 7 and 8 are flowcharts illustrating an example of the process by the terminal device according to the second embodiment. This process is illustrated using another example of the specific process relating to the process described in FIGS. 3 and 4. In the process shown in FIGS. 7 and 8, the process in steps S501 to S508, S601 to S606, and S612 is the same as the process by the terminal device according to the first embodiment described in FIGS. 5 and 6, and the difference from the first embodiment will be mainly described below.

In step S701 in FIG. 5, the distance detector 12 stores, in the storage unit 16, a time at which the distance detector 12 determines that the distance between the terminal device 10 and the electronic lock 20 is greater than or equal to the first distance.

In addition, in step S602 in FIG. 8, if the distance detector 12 determines that the distance between the terminal device 10 and the electronic lock 20 is less than or equal to the second distance, the determination unit 13 performs the process in step S801.

In step S801, the determination unit 13 retrieves, from the storage unit 16, a time at which the terminal device 10 is separated from the electronic lock 20 by the first distance or more. In step S802, the determination unit 13 determines whether a predetermined time or more has elapsed before the terminal device 10 returns to a position within the second distance from the electronic lock 20 since the terminal device 10 is separated from the electronic lock 20 by the first distance or more.

Figure 9:
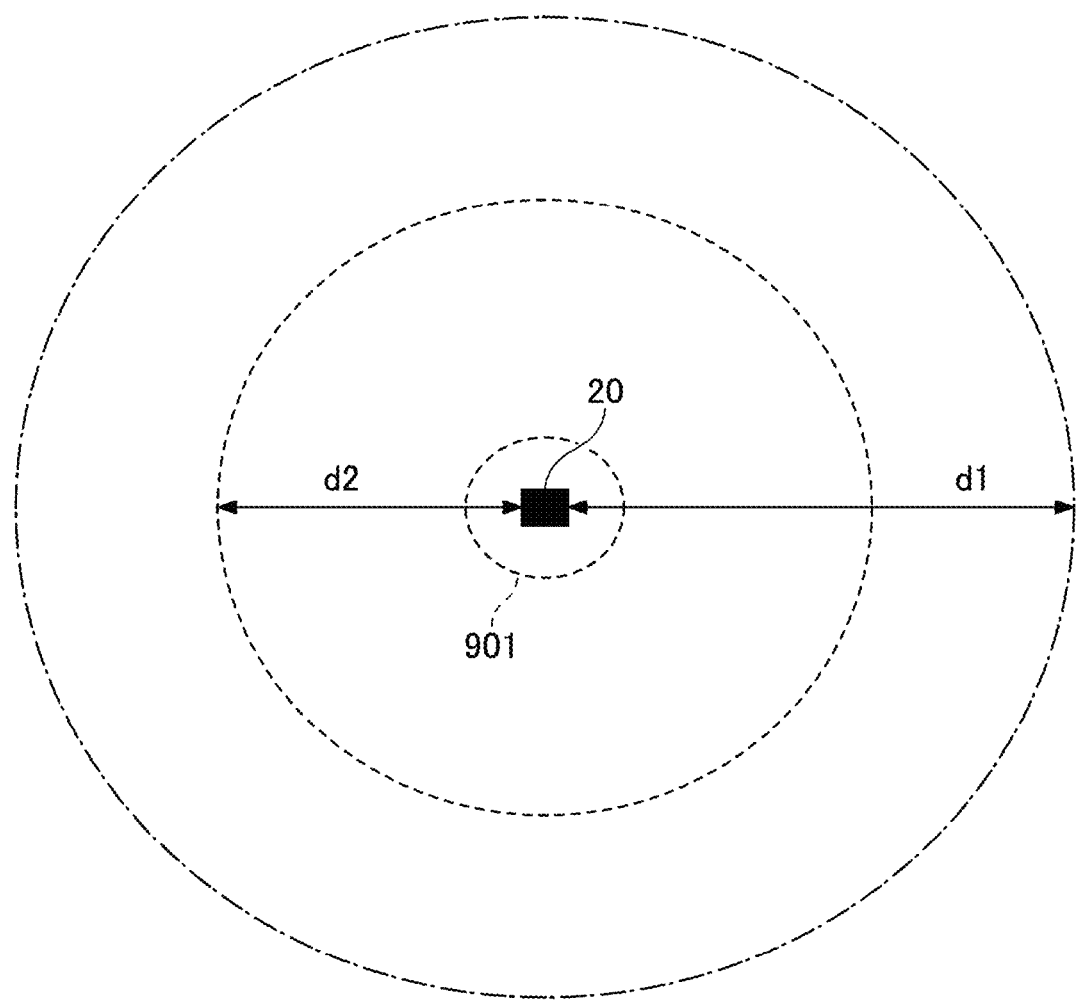
FIG. 9 is a diagram for describing a first distance and a second distance according to one embodiment.

FIG. 9 is a diagram for described the first distance and the second distance according to one embodiment. In the present embodiment, a reaching distance 901 of the Bluetooth signal (which is an example of a predetermined signal transmitted via near-field communication) that the electronic lock 20 transmits is set to, for example, approximately from 5 m to 20 m. A first distance d1 used to determine whether the terminal device 10 is separated from the electronic lock 20 is set to, for example, approximately from 100 m to 200 m.

Further, a second distance d2 used to determine whether the terminal device 10 approaches the electronic lock 20 is set to be less than the first distance d1. For example, the second distance d2 is set to be approximately from 30 m to 70 m. The predetermined time is set to be less than a time period required for a person who is apart from the electronic lock 20 by the first distance d1 or more to return to a position within the second distance d2 or less from the electronic lock 20. For example, the predetermined time is set to be approximately from 10 seconds to 50 seconds. In this arrangement, if the predetermined time or more has not elapsed before the terminal device 10 returns to the position within the second distance from the electronic lock 20 since the terminal device 10 is separated from the electronic lock 20 by the first distance or more, the determination unit 13 can determine that the distance detected by the distance detector 12 is obtained by false detection.

In step S802 in FIG. 8, if a predetermined time or more has not elapsed, the determination unit 13 determines that the distance detected by the distance detector 12 is obtained by false detection, and then transfers the process to step S612. As a result, the unlocking control process is stopped.

On the other hand, in step S802 in FIG. 8, if the predetermined time has elapsed, it is determined that the terminal device 10 returns to a position within a predetermined distance from the electronic lock 20, and then the process after step S603 is performed. In step S811 in FIG. 8, the unlocking process unit 101 performs the unlocking process as illustrated in steps S607 to S611 in FIG. 6.

According to the second embodiment, by the process in FIGS. 7 and 8, the malfunction due to the false detection in the position information can be further reduced in the lock control system 1 that controls the unlocking of the electronic lock 20.

As described above, according to the embodiments of the present disclosure, in the lock control system that controls the unlocking of the electronic lock, the malfunction due to false detection in position information can be reduced.

The present invention is not limited to the above-described embodiments, and various modifications and applications can be adopted within the scope of the present invention set forth in the claims.

For example, in the embodiments described above, the description is provided assuming that the near-field communication is Bluetooth communication, but the near-field communication may include any other communication technique in which a reaching range of a predetermined signal is approximately from 5 m to 20 m, for example, as described in FIG. 9.

DESCRIPTION OF REFERENCE SYMBOLS 1 lock control system
10 terminal device
12 distance detector
13 determination unit
20 electronic lock
101 unlocking process unit
102 stop process unit
d1 first distance
d2 second distance

The invention claimed is:

1. A lock control system comprising:
an electronic lock; and
a terminal device including circuitry configured to
    detect a distance between the electronic lock and the terminal device,
    control unlocking of the electronic lock based on the distance,
    determine whether the distance is falsely detected based on a predetermined signal that the electronic lock transmits via near-field communication, and
    stop the control of the unlocking of the electronic lock upon determining that the distance is falsely detected,
wherein the circuitry is configured to determine that the distance is falsely detected, upon occurrence of a condition in which the terminal device returns to a position within a second distance that is less than a first distance from the electronic lock before a predetermined time elapses since the terminal device is separated from the electronic lock by the first distance or more.

2. The lock control system according to claim 1, wherein the circuitry is configured to determine that the distance is falsely detected, upon occurrence of a condition in which the terminal device is configured to receive the predetermined signal, in conjunction with a condition in which the terminal device detects that the terminal device is separated from the electronic lock by the first distance or more.

3. The lock control system according to claim 2, wherein the circuitry is configured to transmit a control signal to request the electronic lock to be locked, upon occurrence of a condition in which the circuitry receives the predetermined signal via the near-field communication.

4. The lock control system according to claim 2, wherein the first distance is a preset distance used to detect that the terminal device is separated from the electronic lock.

5. The lock control system according to claim 1, wherein the circuitry is configured to
    control the unlocking of the electronic lock upon occurrence of a condition in which the terminal device is separated from the electronic lock by the first distance or more, and
    receive the predetermined signal upon occurrence of a condition in which the terminal device approaches the position within the second distance from the electronic lock.

6. The lock control system according to claim 1, wherein the predetermined time is less than a time period required for a user of the terminal device who is apart from the electronic lock by the first distance or more to return to the position within the second distance from the electronic lock.

7. A terminal device for controlling an electronic lock, the terminal device comprising:
  circuitry configured to
    detect a distance between the electronic lock and the terminal device;
    control unlocking of the electronic lock based on the distance;
    determine whether the distance is falsely detected based on a predetermined signal that the electronic lock transmits via near-field communication; and
    stop the control of the unlocking of the electronic lock upon determining that the distance is falsely detected,
  wherein the circuitry is configured to determine that the distance is falsely detected, upon occurrence of a condition in which the terminal device returns to a position within a second distance that is less than a first distance from the electronic lock before a predetermined time elapses since the terminal device is separated from the electronic lock by the first distance or more.

8. A lock control method by a terminal device for controlling an electronic lock, the lock control method comprising:
  detecting a distance between the electronic lock and the terminal device;
  controlling unlocking of the electronic lock based on the distance;
  determining whether the distance is falsely detected based on a predetermined signal that the electronic lock transmits via near-field communication; and
  stopping the control of the unlocking of the electronic lock upon determining that the distance is falsely detected,
  wherein the determining whether the distance is falsely detected includes determining that the distance is falsely detected, upon occurrence of a condition in which the terminal device returns to a position within a second distance that is less than a first distance from the electronic lock before a predetermined time elapses since the terminal device is separated from the electronic lock by the first distance or more.

9. A non-transitory computer readable storage medium storing a program that causes a computer to execute the lock control method of claim 8.

* * * * *